United States Patent [19]

van Brederode et al.

[11] 3,981,957

[45] Sept. 21, 1976

[54] PROCESS FOR PREPARING FINELY DIVIDED POLYMERS

[75] Inventors: Robert A. van Brederode, Baytown, Tex.; Robert A. Steinkamp, Baton Rouge, La.

[73] Assignee: Exxon Research and Engineering Company, Linden, N.J.

[22] Filed: Aug. 6, 1975

[21] Appl. No.: 602,213

[52] U.S. Cl. ............................... 260/878 R; 264/8; 264/12; 264/13; 528/483; 528/491; 528/502
[51] Int. Cl.² .......................................... C08F 6/00
[58] Field of Search ....... 260/93.7, 94.9 F, 94.9 GC, 260/94.9 GD, 878 R; 264/8, 12, 13

[56] References Cited
UNITED STATES PATENTS

| | | | |
|---|---|---|---|
| 3,119,801 | 1/1964 | Haskell | 260/94.9 GD |
| 3,244,687 | 4/1966 | Spindler | 260/94.9 GD |
| 3,306,342 | 2/1967 | Di Salvo et al. | 264/12 |
| 3,563,975 | 2/1971 | Zavasnik | 260/94.9 F |
| 3,743,272 | 7/1973 | Nowotny et al. | 260/94.9 GD |
| 3,849,516 | 11/1974 | Plank | 260/878 R |
| 3,862,265 | 1/1975 | Steinkamp et al. | 260/878 R |
| 3,882,095 | 5/1975 | Fowells et al. | 260/94.9 F |
| 3,891,499 | 6/1975 | Kato et al. | 264/13 |
| 3,896,196 | 7/1975 | Dickey et al. | 264/13 |
| 3,936,512 | 2/1976 | Tabara et al. | 260/94.9 GD |

*Primary Examiner*—Alan Holler
*Attorney, Agent, or Firm*—David A. Roth

[57] ABSTRACT

A high density polymer powder is prepared by preparing a melt of the polymer, and intimately mixing from 10 to 50 weight percent of a solvent therewith, and discharging the mixture through an atomizing nozzle.

17 Claims, 2 Drawing Figures

PROCESS FOR PREPARING FINELY DIVIDED POLYMERS

BACKGROUND OF THE INVENTION

This invention relates to the preparation of finely divided normally solid, synthetic organic polymeric thermoplastic resins.

Thermoplastic polymers in powder or finely divided form have a wide variety of commercial applications, such as for example, the dry powders have been used to coat articles in dry form by dip coating in either static or fluidized beds, by electrostatic coating, spraying or dusting and flame spraying. The powders are used in dispersed form in suitable liquid carriers to apply coatings by roller coating, spray coating, and dip coating to a variety of substrates such as, glass, ceramics, metal, wood, cloth, paper, paperboard, and the like. The finely divided polymers have also been successfully employed in conventional powder molding techniques. The fine powders have also been applied as paper pulp additives, mold release agents, wax polish, paint compositions, binders for non woven fabrics and finishes for woven fabrics.

There are basically four types of processes employed in the prior art for preparing finely divided polymer particles, i.e., mechanical grinding, solvent precipitation, dispersion and spray atomization of solutions or slurries.

Generally mechanical grinding employs conventional equipment to yield particles of irregular shape and wide size variation of from about 75 to 300 microns. The powders produced by this method are not suitable for applications where free flowing powders are required, since the irregular shapes may inhibit the flowability of these powders. The grinding of some polymers may be very costly because of the toughness of the resin, even when cryogenically cooled.

The precipitation technique generally entails dissolving the polymer in a solvent, followed by precipitation of the polymer in finely divided form through addition of a nonsolvent, evaporation of the solvent or a combination of the two. Problems in this process have included difficulty in manipulating the solvents, solvent removal, particle agglomeration which requires a great deal of energy and particles having irregular somewhat rounded shapes.

The dispersion method also is subject to high shear conditions. Frequently water in the dispersing medium and dispersing agents are used to facilitate the dispersion. Hence the powders produced by this technique generally incorporate some or all of the dispersing agent in the powder which can create undesirable changes in the original polymer properties, e.g., increased water sensitivity, loss of electrical insulating values, loss of adhesive capabilities, etc.

The final type of prior art process is the spray technique which is generally satisfactory for producing uniform non-agglomerated spherical particles, however, very speciallized equipment, usually nozzles operating under a limited range of conditions to prevent nozzle plugging are required. A substantial problem in spraying is the shearing of a polymer solution as it passes through the nozzle, premature precipitation of the polymer or too rapid volatilization.

Spray drying solutions of polymers is a difficult procedure. Large irregular particles or only fibers frequently result from sprayed polymer solutions. Not infrequently powder products from spraying are spheres with fine tails. Another frequent problem with spraying solutions has been a build up of precipitated polymer on the spray nozzles and generally sprayed solutions of polymer contain less than 30% by weight of the polymer. Furthermore, recovery and storage of the solvent can entail substantial equipment installations. Attempts to overcome these problems, generally have involved, random modification of process variables, changes of solvent and exotic spraying and atomizing equipment.

Some spray techniques, such as shown in U.S. Pat. No. 3,166,613 or Belgian Pat. No. 702,690, spray molten polymer, where molten polymer is pumped into a high velocity gas or vapor stream and discharged through a suitable nozzle. A principal problem encountered with this approach is the relatively high temperatures required to reduce the polymer viscosity to a satisfactory level for spraying, which can cause a substantial degradation in the molecular weight of the polymer.

The present invention has advantages over the prior spraying methods in that it may operate at lower temperatures than molten spraying techniques, hence less polymer degradation, yet will not involve the large recovery problems of solution spraying.

SUMMARY OF THE INVENTION

Briefly stated the present invention is a process for producing a high density polymer powder comprising heating a normally solid polymer to form a melt, intimately mixing into said melt from 10 to 50 weight percent of a solvent and discharging said mixture of polymer melt and solvent through an atomizing nozzle.

DRAWINGS

DETAILED DESCRIPTION OF THE INVENTION

Figure 1:
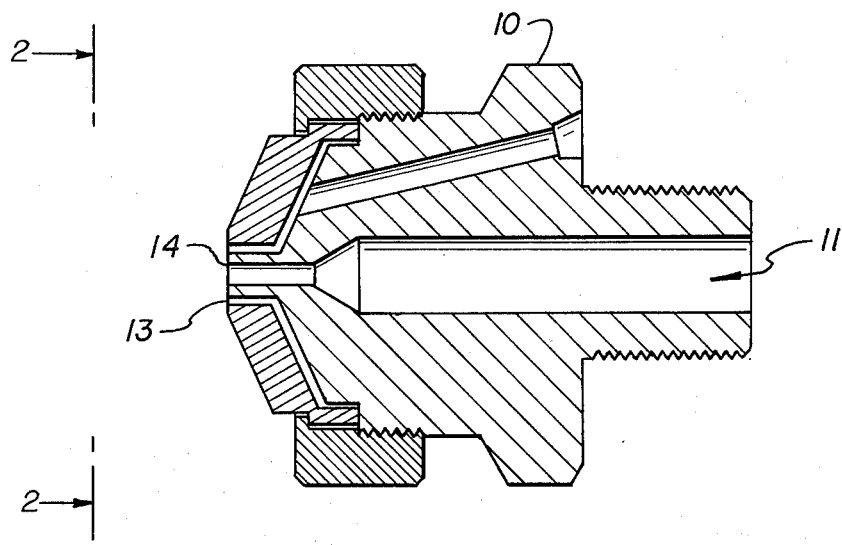
FIG. 1 shows a simple spraying nozzle that may be employed in the process in cross section.
Figure 2:
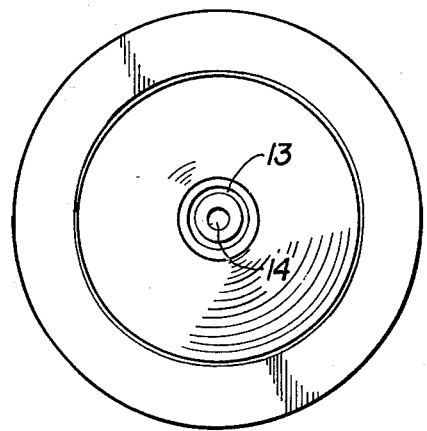
FIG. 2 is a front view of the nozzle.

In general the polymers suitable for the practice of the present invention include any normally solid synthetic organic polymeric thermoplastic resin. Included are polyolefins, vinyls, olefinvinyl copolymers, olefin-allyl copolymers, polyamids, acrylics, polystyrene, cellulosics, polyesters, and polyhalocarbons. ll Vinyl polymers suitable for use herein include polyvinyl chloride, polyvinyl acetate, vinyl chloride/vinyl acetate copolymers, polyvinyl alcohol and polyvinyl acetal.

Among the suitable olefin-vinyl copolymers are ethylene-vinyl acetate, ethylene-vinyl propionate, ethylene vinyl isobutyrate, ethylene-vinyl alcohol, ethylene-methyl acrylate, and the like. Olefin-allyl copolymers include ethylene-allyl alcohol, ethylene-allyl acetate, ethylene-allyl acetone, ethylene-allyl benzene, ethylene-allyl ether, and the like.

Examples of some specific acrylic polymers are polymethyl methacrylate, polyacrylonitrile, polymethylacrylate and polyethylmethacrylate. The polyamides suitable for use include polyhexamethylene adipamide, polyhexamethylene sebacamide, and polycaprolactam.

Generally the most suitable polyolefins for use in the present process include normally solid polymers of mono-alpha-olefins, which comprise from 2 to 6 carbon atoms, for example, polyethylene, polypropylene, polybutene, polyisobutylenes, poly (4-methylpentene- 1), copolymers of these various alpha-olefins and the like.

The catalyst for alpha-olefin polymerization normally contains a transition metal compound, preferably a halide and a reducing component consisting normally of aluminum metal or a metal alkyl compound. Representative of the transition metal compounds used is a metal selected from Groups 4B, 5B, and 6B of the Periodic System.* Included in the preferred species are the titanium halides, for example, titanium tetrachloride, titanium trichloride, and titanium dichloride, and mixtures thereof. Other metal compounds such as zirconium tetrahalide and hafnium tetrachloride, vanadium chloride, chromium chloride, tungsten chloride, and the like, are especially useful. Still other transition metal halides containing halogens selected from the group consisting of bromine, iodine, chlorine, and in certain instances fluorine, can also be used.

* Handbook of Chemistry and Physics, The Chemical Rubber Co., Cleveland, Ohio, 45th Edition, 1964, p. B-2.

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain Ziegler catalysts, or more particularly, certain modified Ziegler catalysts, have been found to be especially useful for polymerizing alpha-olefins. For example, a titanium trichloride catalyst modified with aluminum chloride having the formula, $TiCl_3 \cdot \frac{1}{3}AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

A variety of monomers may be polymerized with the Ziegler type catalysts. Any unsaturated hydrocarbon corresponding to the general formula $R—CH=CH_2$, wherein R is selected from the group consisting of an alkyl radical having from one to six carbon atoms, a phenyl radical, and an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like.

The preferred catalyst composition for the polymerization of propylene comprises a modified titanium trichloride having the structural formula, $TiCl_3 \cdot \frac{1}{3}AlCl_3$, activated with diethyl aluminum chloride. Ratios of diethyl aluminum chloride and titanium trichloride of between 0.3:1 and 6:1 may be advantageously used. The presence of an alkali metal halide in an amount of between 0.5 to 10 mols of an alkali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

The monomers may be polymerized at moderate temperatures and pressures with the Ziegler type catalysts described above, generally at temperatures of 0° to 150° C, with temperatures on the order of 25° to 80° C being particularly useful. A solvent such as a paraffin or cycloparaffin having 3 to 12 carbon atoms, may be employed for the polymerizations, however, the olefin monomer is frequently used for this purpose. The polymerizations are preferably conducted under conditions that exclude atmospheric impurities such as moisture, oxygen and the like.

The pressure ranges from about atmospheric pressure to about several atmospheres with pressures in excess of about 500 p.s.i. rarely being employed.

After the polymer has been produced, the catalyst is deactivated by contacting the polymeric reaction mixture with a material which reacts with and deactivates the catalyst at the polymer neutralized washed and recovered as known in the art.

The term polyolefins as used here includes those materials modified with materials such as the unsaturated organic acids, for example, maleic acid, muconic acid, dimethyl muconic acid, acrylic acid, methacrylic acid, vinyl acetic acid and the like. Generally the polyolefins may be modified by from 1 to 10 weight percent of the unsaturated acid. The modification has been observed to improve the surface adhering characteristics of the polyolefin polymers when they are employed as face coatings, particularly the alpha-olefins, such as polypropylene. The modifying unsaturated acids may be incorporated into the polyolefins by intimately contacting the modifier with the polyolefin in a melt or solution of the polymer.

In the process of the present invention it is possible to employ graft polymers prepared by known methods in the art, e.g. those to be found in U.S. Pat. Nos. 3,177,269; 3,177,270; 3,270,090; 3,830,888; 3,862,265; British Pat. Nos. 1,217,231; 679,562 and the like.

The preferred modifying monomers which are grafted to the backbone are $C_3$ to $C_{10}$, preferably $C_3$ to $C_6$ unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, cyano ethyl acrylate, hydroxy ethyl methacrylate, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, magnesium acrylate and the like.

Other monomers which can be used either by themselves or in combination with one or more of the carboxylic acids or derivatives thereof include $C_8$ to $C_{50}$ vinyl monomers such as monovinyl aromatic compounds, i.e. styrene, chlorostyrenes, bromostyrenes, alpha-methyl styrene and the like.

Other monomers which can be used are $C_8$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

The process of the present invention is especially useful for grafted polymers prepared by grafting a polymer of a $C_2$ to $C_8$ mono-a-olefin or its copolymers with acrylic acid in a special process. The polymers of $C_2$ to $C_8$ mono-a-olefins are commonly referred to as polyolefins and for the purpose of this invention are to include copolymers of the $C_2$ to $C_8$ mono alphaolefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono- or diolefins) or vinyl monomers such as ethylene-propylene copolymers or with one or more additional monomers, i.e. EDPM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The starting polymer used as a base material in the graft process will preferably have a melt index (MI) (ASTM D-1238-65T) of 1 to 40, preferably 5 to 40, and most preferably 15 to 40, or melt flow rate (MFR) beteenn about 0.1 to 50 and preferably 1.0 to 10, most preferably 2 to 5. These melt flow rates correspond approximately to viscosity average molecular weights of about 100,000 to 500,000.

The preferred monomers to be grafted to the $C_2$ to $C_8$ polyolefin and other polymers for use in the present invention are maleic anhydride, acrylic acid, methacrylic acid, glycidyl acrylate, hydroxy ethyl methacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free radical initiator which is preferably an organic peroxygen compound. Especially preferred peroxides are t-butyl perbenzoate, dicumyl peroxide, 2,5-dimethyl-2,5-di-tert-butylperoxy-3 hexyne (Lupersol 130), $\alpha$, $\alpha'$-bis (tert-butylperoxy) diisopropyl benzene (VulCup R or Percadox 14), or any free radical initiator having a 10-hour half-life temperature over 80°C. or mixtures thereof. Generally, the higher the decomposition temperature of the peroxygen compound, the better. See pp 66–67 of *Modern Plastics*, November 1971, which is incorporated hereby by reference, for a more complete list of such compounds.

The free radical initiator is used in amounts corresponding to 0.005 to 5, preferably 0.02 to 2, most preferably 0.02 to 1.0 weight percent based on monomer. When based on polymer, free radical initiator is used in amounts of 0.0001 to 1, preferably 0.001, and most preferably 0.001 to 0.5 weight percent.

The monomer to be graft polymerized is used in amounts of 0.01 to 100, preferably 0.05 to 50, and most preferably 0.1 to 25 weight percent of the base polymer.

Generally, the monomer and initiator are blended together and added simultaneously, except in the situation of a polyethylene or ethylene predominant copolymer. Illustrative of the graft preparation is the grafting of acylic acid onto polypropylene. Molten polypropylene is contacted with acyclic acid at 400° to 650° F, preferably 400° to 550° F in the presence of a peroxide initiator. The initiator and acrylic acid are added as a liquid blend. The resulting graft copolymers have been appreciably degraded and changed in molecular weight as compared to the base polymer.

The temperature of the melt in the present spray process should be adjusted to lie in the range between the melting point of the polymer and the maximum temperature at which no chemical change, e.g., degradation, occurs in the polymer. Preferably it is best to carry out the present process as near to the melting point of the polymer as possible. Furthermore, since polymer degradation is a function of both time and temperature the residence time of the molten polymer in the equipment should be held to a minimum.

The solvents which may be employed include not only those materials which are considered good solvents, but may also include the so called "poor" solvents. This is partly because of the high temperatures used to melt the polymer. Suitable solvents include paraffins or cycloparaffins having 5 to 12 carbon atoms, such as n-pentane, isopentane, isooctane, cyclohexane, methylcyclohexane, nonane, and the like or mixtures of solvents which may be classed as "good" solvents. The poor solvents include for example nitrobenzene, methylene chloride, the chlorinated benzenes and the like. Suitable solvents may be described as organic compounds which exhibit some solubility for the polymer under the conditions of use.

The solvent is preferably fed at about the same temperature as the polymer melt and should at least be at the melting point of the polymer. The solvent can be at higher temperatures than the melt, however, there will generally be no greater than 20C° difference and preferably less in the temperature of the streams.

The solvent and melt are contacted and intimately mixed, preferably at a point as near the melting of the polymer as possible. The melting and intimate mixing can be carried out substantially simultaneously, thereby reducing the necessary residence time of the polymer at elevated temperatures. The solvent may be conveniently mixed with the melt in an extruder barrel, static mixer or other vessel. The mixing is carried out at sufficient pressure to maintain the solvent in a predominantly liquid phase.

Only about 10 to 50 weight percent of solvent is used, preferably less than 40 percent, based on the total of solvent and polymer melt, compared to a typical solvent system containing 80 to 90% solvent. The solvent serves to reduce the viscosity of the melt at a lower temperature than would be required with the polymer alone, yet relatively small amounts of solvent are employed in regard to solvent systems.

The solvent is added under pressure, in those instances where the vapor pressure of the solvent is greater than 760 mm of Hg at the temperature of the melt. It is not essential that solvent flash off as the atomized mixture leaves the nozzle. It is an advantage, however, if substantially all of the solvent is removed from the powder particles, so that a relatively dry powder, needing little or no further drying is recovered.

The polymer melt-solvent stream may be atomized with or without a blowing stream of gas. The figures show a conventional, simple nozzle in which a blowing gas is used to aid atomization. The use of steam or an inert gas such as nitrogen, helium or the like reduces the hazard of a dust expolosion in the collector. However, a single fluid nozzle may be used.

The particles recovered have substantially spherical shape of fine, less than 200 microns, size.

In one embodiment of the present invention the modified polymers, such as polypropylene modified with acrylic acid, is fed directly from the portion of the extruder, wherein the modified polymer is prepared, intimately mixed with a solvent and sprayed according to the present invention to produce powder of the modified polymer.

It is necessary to determined for each polymer and solvent the precise conditions and amount of solvent to be employed, which will require only a minimum amount of routine work for the skilled experimenter to obtain optimum results.

The polymers may contain conventional thermal and ultraviolet stabilizers, flame retardants, dyestuffs and even fillers, such as titanium dioxide, talc and the like, provided these materials are of fine enough size.

Referring now to the figures a conventional two fluid nozzle 10, is shown. In FIG. 1, a liquid conduit 11 is in the center of the nozzle, through which the mixture of polymer melt and solvent is forced at a pressure of from 5 to 300 atmospheres and out opening 14. Adjacent to and concentric about the opening 14 is opening 13 which connects to a conduit, through which a blowing gas, such as nitrogen is forced at a pressure of 10–150 psi. This nozzle is a standard atomization nozzle.

EXAMPLE 1

A nozzle* such as that shown in the drawings is employed. The nozzle is stainless steel and has a liquid orifice of 0.020 inch ID and a 0.007-inch gas annulus. The atomizing gas is nitrogen. The feed is polypropylene melt. Temperatures are measured by thermocouples. The conditions in the atomizing nozzle are:

Feed Rate: 10 grams of polymer per minute
Feed temp. °F variable
Nozzle temp. 450° F
Nitrogen temp. 590°F
Nitrogen pressure 40 psi at feed temperatures of 800° F+ mainly powder is produced. At lower temperatures, e.g., 600° F, fibers are produced. The same apparatus is also used to produce powdered low density polyethylene. At temperatures of 790° to 870° C mainly powder is produced.

* Spraying Systems Co. Wheaton, Illinois

The powder products produced under these conditions when compared to the polymer feed is found to be substantially degraded, vis.

| | Nozzle Feed Temp. °F | Intrinsic Viscosity |
|---|---|---|
| Polypropylene Pellet Feed | | 1.50 |
| | 780 | 0.49 |
| | 850 | 0.34 |
| Polyethylene Pellet feed | | 1.04 |

-continued

| Nozzle Feed Temp. °F | Intrinsic Viscosity |
|---|---|
| 870 | 0.40 |

EXAMPLE 2-11

The same apparatus as described in Example 1 is used but the polypropylene or polyethylene melt is mixed with 30% of a solvent and sprayed through the nozzle. The solvents and conditions are set forth in Table I. Powder of the same type as produced in Example 1 is the main product. Examination of the intrinsic viscosity shows only slight degradation of the polypolymers.

TABLE I

| | Melt Temp °F | Type | Solvent °F | Pressure Psi |
|---|---|---|---|---|
| Polyethylene | | | | |
| 2 | 300 | heptane | 300 | 10 |
| 3 | 300 | octane | 300 | 5 |
| 4 | 350 | octane | 350 | 10 |
| 5 | 350 | octane | 350 | 5 |
| 6 | 300 | hexane | 350 | 15 |
| Polypropylene | | | | |
| 7 | 370 | hexane | 400 | 25 |
| 8 | 370 | octane | 400 | 10 |
| 9 | 400 | hexane | 400 | 25 |
| 10 | 400 | octane | 400 | 10 |
| 11 | 400 | octane | 440 | 10 |

Examples 2–11 are constructive.

The invention claimed is:

1. A process for producing high density polymer powder comprising:
   heating a normally solid thermoplastic polymer to form a melt,
   intimately mixing into said melt from 10 to 50 weight percent of a solvent, and
   discharging said mixture through an atomizing nozzle.

2. The process according to claim 1 wherein the temperature of the melt is between the melting point of the polymer and the maximum temperature at which no chemical change occurs in the polymer.

3. The process according to claim 2 wherein the maximum temperature of the melt is the temperature at which substantially no degradation of the polymer occurs.

4. The process according to claim 2 wherein the temperature of the solvent is at least the melting point of the polymer.

5. The process according to claim 4 wherein the temperature of the solvent is within 40F° of temperature of the polymer of the polymer melt.

6. The process according to claim 1 wherein the intimate mixing is carried out under pressure.

7. The process according to claim 6 wherein the pressure is sufficient to maintain the solvent liquid phase.

8. The process according to claim 1 wherein there is less than 40 weight percent solvent based on the total of solvent in polymer melt.

9. The process according to claim 1 wherein the intimate mixture is contacted with a blowing gas during atomization.

10. The process according to claim 9 wherein the blowing gas is inert.

11. The process according to claim 4 wherein the intimate mixing is carried out under sufficient pressure to maintain the solvent in liquid phase and the mixture is contacted with an inert blowing gas during atomization.

12. The process according to claim 11 wherein the solvent is a paraffin or cycloparaffin having 5 to 12 carbon atoms.

13. The process according to claim 12 wherein the polymer comprises polypropylene.

14. The process according to claim 12 wherein the polymer comprises polyethylene.

15. The process according to claim 12 wherein the polymer comprises grafted polyolefins.

16. The process according to claim 15 wherein said grafted polyolefins is acrylic acid grafted.

17. The process according to claim 15 wherein said grafted polyolefin is glycidyl acrylate grafted.

* * * * *